(12) United States Patent
Ward

(10) Patent No.: US 10,767,793 B2
(45) Date of Patent: Sep. 8, 2020

(54) JUMPER TUBE CONNECTOR

(71) Applicant: Stephen Ward, Cypress, TX (US)

(72) Inventor: Stephen Ward, Cypress, TX (US)

(73) Assignee: Delta Screen & Filtration, LLC, Houston, TX (US)

( * ) Notice: Subject to any disclaimer, the term of this patent is extended or adjusted under 35 U.S.C. 154(b) by 444 days.

(21) Appl. No.: 15/918,443

(22) Filed: Mar. 12, 2018

(65) Prior Publication Data

US 2018/0266594 A1 Sep. 20, 2018

Related U.S. Application Data

(60) Provisional application No. 62/471,079, filed on Mar. 14, 2017.

(51) Int. Cl.
*F16L 21/08* (2006.01)
*F16L 21/03* (2006.01)
*E21B 43/08* (2006.01)
*E21B 17/04* (2006.01)

(52) U.S. Cl.
CPC .............. *F16L 21/03* (2013.01); *E21B 17/04* (2013.01); *E21B 43/08* (2013.01); *F16L 21/08* (2013.01)

(58) Field of Classification Search
CPC ......... F16L 21/03; F16L 21/002; F16L 21/02; F16L 21/022; F16L 21/08; F16L 25/0009; F16L 25/04; F16L 25/06; F16L 25/065; F16L 25/08; E21B 17/04; F16B 7/182; Y10T 403/5741

USPC .............. 285/404, 403, 369, 370, 371, 417; 403/362, 306

See application file for complete search history.

(56) References Cited

U.S. PATENT DOCUMENTS

| | | | | |
|---|---|---|---|---|
| 1,103,749 A | * | 7/1914 | Finkelstein | H01R 4/60 174/84 S |
| 3,342,457 A | * | 9/1967 | Bobrowski | E04F 11/181 256/21 |
| 3,462,021 A | * | 8/1969 | Hawke | A47F 5/14 211/182 |
| 3,500,264 A | * | 3/1970 | Floyd, Jr. | H01P 1/042 333/254 |
| 3,560,029 A | * | 2/1971 | Floyd | H01P 1/042 285/369 |
| 3,677,579 A | * | 7/1972 | La Vanchy | F16L 25/0009 285/148.1 |
| 4,668,000 A | * | 5/1987 | Jokela | B62D 29/008 296/43 |
| 10,711,451 B2 | * | 7/2020 | Bedel | B65D 19/385 |
| 10,711,579 B2 | * | 7/2020 | Sessa | E21B 43/04 |

(Continued)

*Primary Examiner* — Aaron M Dunwoody
(74) *Attorney, Agent, or Firm* — Keeling Law, LLC; Kenneth A. Keeling; Mark S. Solomon

(57) ABSTRACT

Embodiments of an apparatus of the present invention generally include a tubular, substantially exteriorly rectangular, jumper tube connector having a substantially rectangular interior cavity having a plurality of transverse grooves disposed in the surface thereof and extending there around, wherein at least a portion of the jumper tube connector along its two opposing wide sides has a non-uniform wall thickness, at least a portion of which being thicker than a substantially uniform wall thickness of the connector's two opposing narrow sides. A method of connecting shunt tubes utilizing the apparatus is also provided.

20 Claims, 7 Drawing Sheets

(56) References Cited

U.S. PATENT DOCUMENTS

| | | | | |
|---|---|---|---|---|
| 2006/0067785 | A1* | 3/2006 | Holdsworth | E04C 5/165 |
| | | | | 403/306 |
| 2013/0285374 | A1* | 10/2013 | Kobayashi | F16L 23/024 |
| | | | | 285/417 |
| 2014/0014314 | A1* | 1/2014 | Cunningham | E21B 43/08 |
| | | | | 166/51 |
| 2014/0196809 | A1* | 7/2014 | Klein | F16L 55/24 |
| | | | | 138/39 |
| 2016/0356098 | A1* | 12/2016 | Ward | E21B 17/046 |
| 2018/0298730 | A1* | 10/2018 | Sessa | E21B 43/045 |
| 2018/0299046 | A1* | 10/2018 | Sessa | F16L 21/035 |

* cited by examiner

JUMPER TUBE CONNECTOR

CROSS-REFERENCE TO RELATED APPLICATIONS

This application claims the benefit of U.S. Provisional Applications No. 62/471,079, filed on Mar. 14, 2017, which application is incorporated herein by reference as if reproduced in full below.

STATEMENT REGARDING FEDERALLY SPONSORED RESEARCH OR DEVELOPMENT

Not applicable.

FIELD OF THE INVENTION

The present invention relates generally to an apparatus for connecting tubulars. More specifically, the present invention encompasses an apparatus which is utilized in connecting shunt tubes.

BACKGROUND

Down-hole completion operations commonly require filter screens to restrain flow of sand and particulates existing in the well environment from entering pipe openings. In a common application, shunt tubes are utilized exterior of a base pipe to provide downhole fluid communication independent of flow through the base pipe.

As presently practiced, jumper tubes are provided at connections of the base pipe sections. Jumper tubes provide fluid connection of a shunt tube on a pipe section to a corresponding shunt tube attached to an adjoining pipe section. Jumper tubes are typically installed after connection of pipe sections.

Generally, for adjoining pipe sections, shunt tube ends are aligned when pipe sections are connected. The jumper tube is inserted between respective shunt tube ends. The jumper tube has a connector at each end comprising a telescoping tube section slideable on the jumper tube. Each telescoping tube section is extended to cover a corresponding shunt tube end. Sealing components, such as o-rings, are provided intermediate the telescoping connector sections and corresponding jumper tube sections, and intermediate the telescoping sections and corresponding shunt tube ends to provide a contained fluid flow path from a shunt tube through a jumper tube to the next corresponding shunt tube.

Traditionally, set screws are used to retain a telescoping tube section to a corresponding shunt tube end and to retain a telescoping tube end to a corresponding jumper tube. Exemplary jumper tube connectors utilizing set screws are described in U.S. Pat. No. 7,497,267 to Setterberg, Jr. and U.S. Pat. No. 7,886,819 to Setterberg, Jr. In one known technology, as disclosed in U.S. Patent Application Publication No. 2013/0220606, removable "snap-on clips" may be utilized to secure a jumper tube connector. In another known technology, as disclosed in U.S. Patent Application Publications Nos. 2016/0356098 and 2017/0204682, which applications are incorporated herein by reference as if reproduced in full below, various jumper tube attached fasteners, such as snap clips, and/or shunt tube attached fasteners, such as retention clips, are utilized to secure a jumper connector. By another technology, as is disclosed in U.S. Pat. No. 9,562,402, which patent is incorporated herein by reference as if reproduced in full below, jumper tube connectors are secured by means of a retainer ring segment disposed on the interior of a shroud assembly utilized to protect the jumper tube connector assembly.

In a typical industry embodiment, the shunt tubes to be connected are not substantially round tubulars, but rather are more rectangular in shape. Accordingly, typically employed jumper tube connectors have a corresponding interior substantially rectangular geometry. Currently used jumper tube connectors have a generally uniform circumferential wall thickness, and based on dimensional limitations and other considerations, are generally exteriorly rectangular in shape. As would understood by one skilled in the art, the maximum internal fluid pressure such assemblies can withstand is effectively determined by the fluid seal provided by the o-rings. One limitation of such rectangularly shaped tubular configurations is that the "wide" side of the tubular is less geometrically pressure stable than the "narrow" side of the tubular. In certain high-pressure applications, the internal fluid pressure can actually deform the jumper connector along the "wide" sides of the tubular, and compromise the seal provided by the o-ring. It is often desired, however, to operate at fluid pressure levels above the effective limit of current jumper connector/o-ring arrangements.

BRIEF SUMMARY OF THE INVENTION

Embodiments of an apparatus of the present invention generally comprise a tubular, substantially exteriorly rectangular, jumper tube connector comprising an internally substantially rectangular cavity comprising a plurality of grooves disposed in the surface thereof and adapted to accommodate an o-ring sealing component, wherein at least a portion of the jumper tube connector along its two opposing wide sides comprises a non-uniform wall thickness, at least a portion of which being thicker than a substantially uniform wall thickness of the connector's two opposing narrow sides. A method of connecting shunt tubes utilizing the apparatus is also provided.

BRIEF DESCRIPTION OF THE DRAWINGS

For a more complete understanding of the exemplary embodiments, reference is now made to the following Description of Exemplary Embodiments of the Invention, taken in conjunction with the accompanying drawings, in which.

DETAILED DESCRIPTION OF EXEMPLARY EMBODIMENTS OF THE INVENTION

Figure 1:
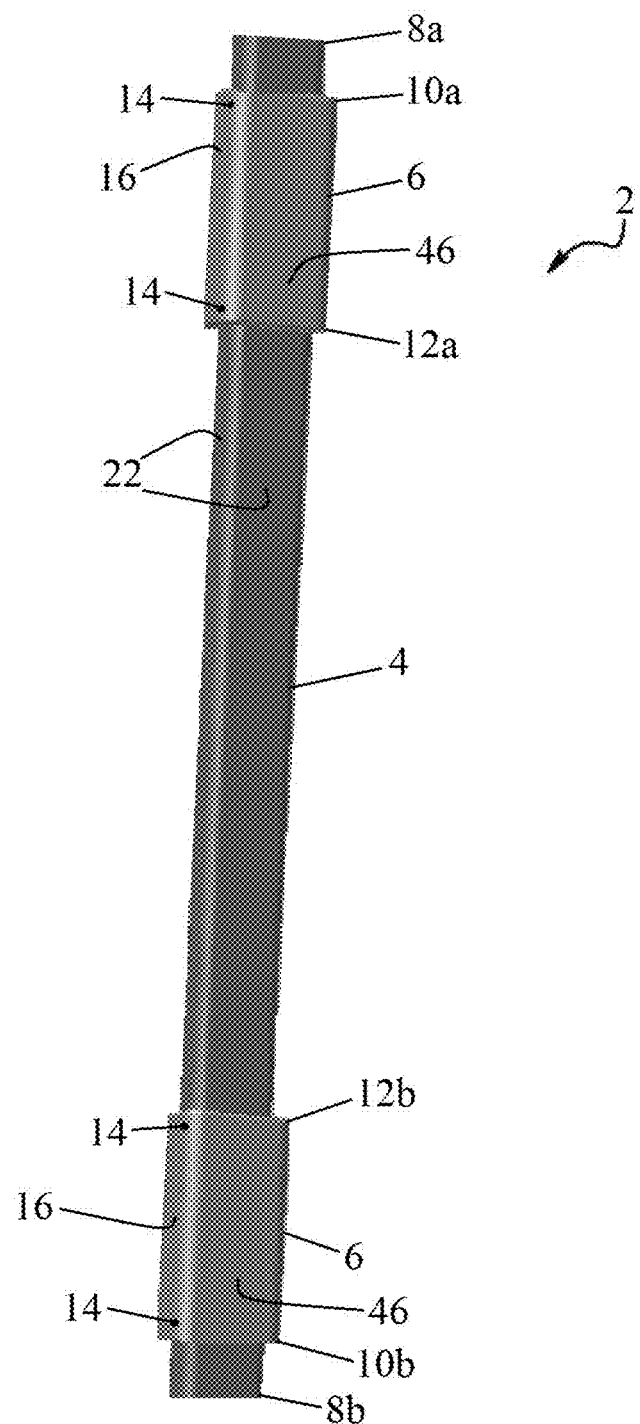
FIG. 1 depicts a standard prior art jumper tube connector assembly.
Figure 2:
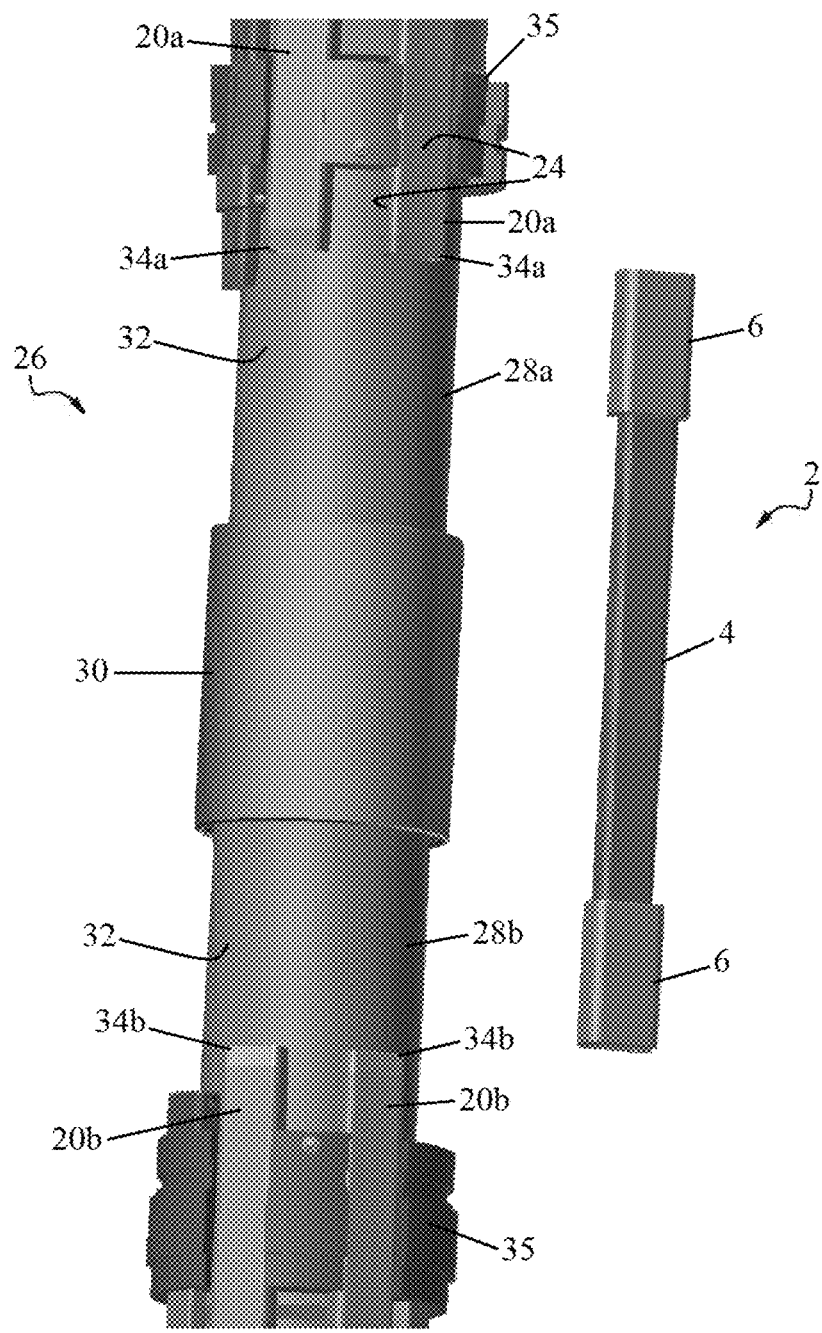
FIG. 2 depicts a standard prior art jumper tube connector assembly positioned in proximity to a pair of installed shunt tubes to be fluidly connected.
Figure 3:
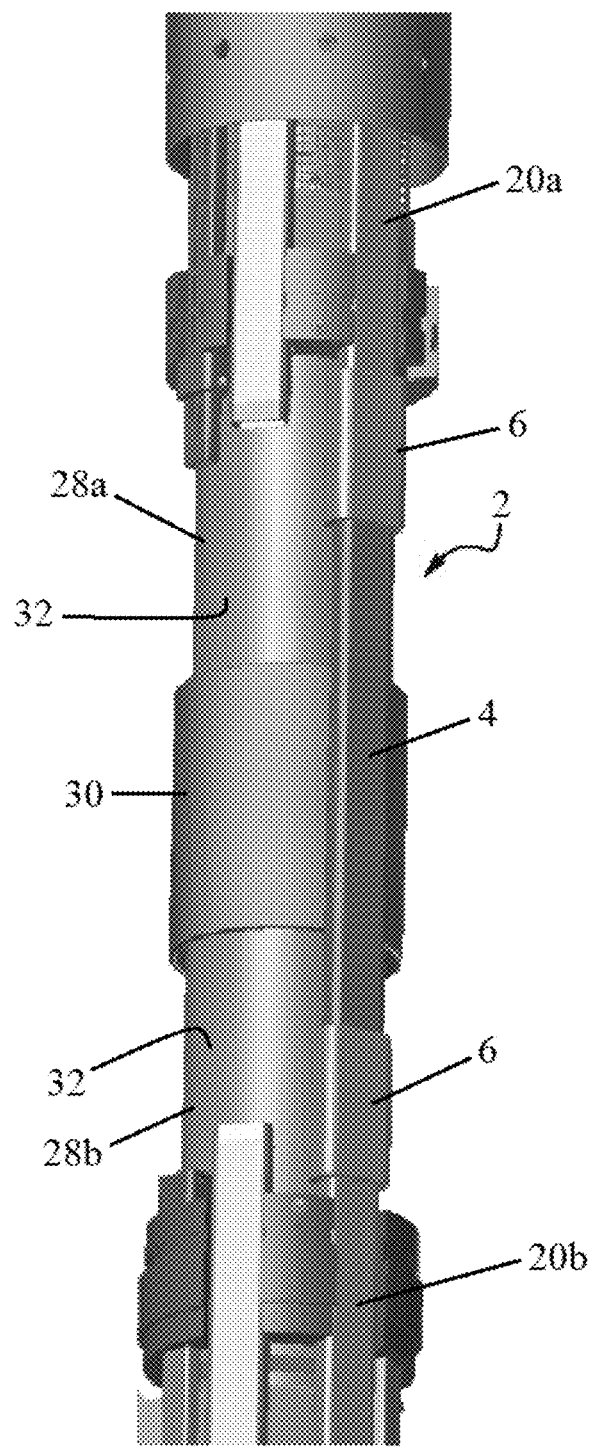
FIG. 3 depicts a standard fluid connection of shunt tubes utilizing a prior art jumper tube connector assembly.

The exemplary embodiments are best understood by referring to the drawings with like numerals being used for like and corresponding parts of the various drawings. Use of relative terms herein, such as "top," "bottom," "upper," "lower," "right," "left," and the like, are used for illustrative purposes only are not intended to limit the invention to a disclosed orientation or arrangement. FIGS. 1-3 depict a prior art shunt tube connection technology. Although the embodiments of the invention described herein are disclosed in reference to connection of shunt tubes, the invention is not so limited and may be employed in the connection of any types of tubes, pipes, or the like.

Figure 4:
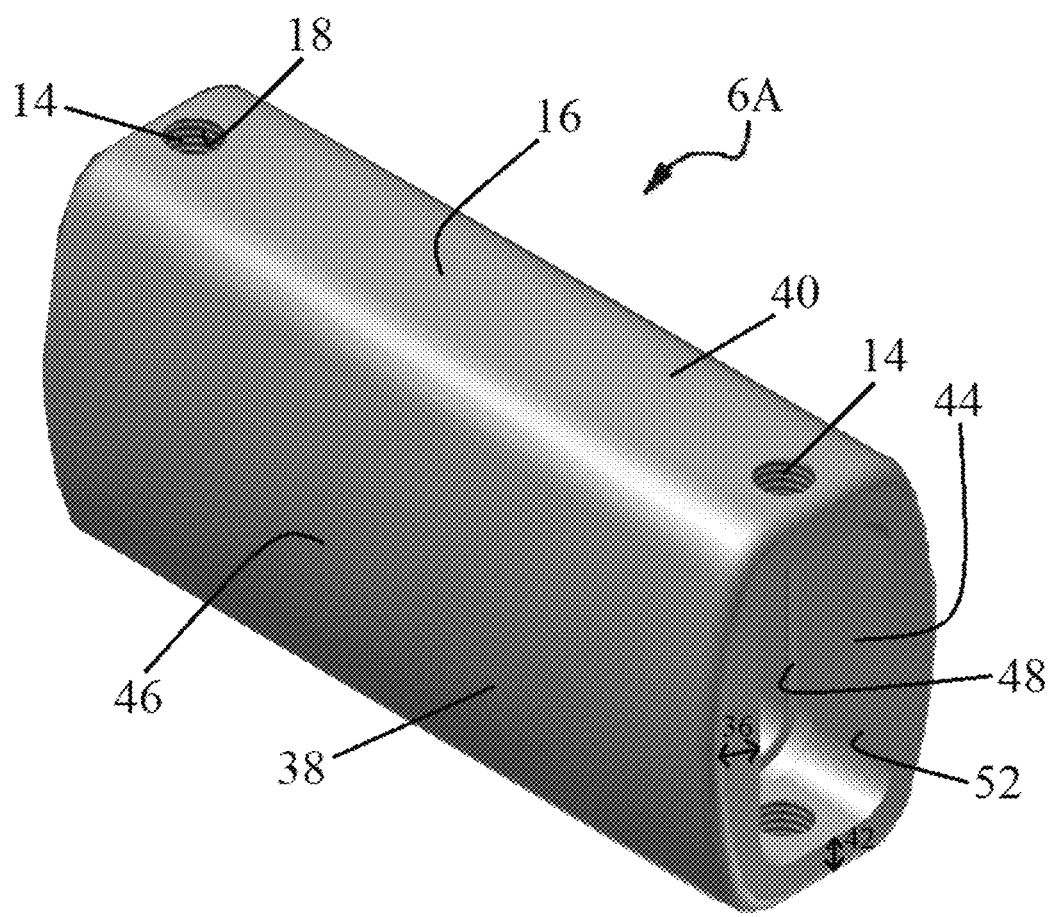
FIG. 4 depicts an embodiment of a jumper tube connector of the present invention.

FIG. 1 depicts a standard prior art jumper connector assembly 2 comprising a jumper tube 4 and two jumper tube connectors 6, wherein one jumper tube connectors 6 is circumferentially disposed proximate each end 8a, 8b, of jumper tube 4. Each jumper tube connector 6 comprises a distal end 10a, 10b, and a proximal end 12a, 12b. Each jumper tube connector 6 is circumferentially engaged around jumper tube 4, and slidingly movable there along. In one aspect, one or both jumper tube connectors 6 comprise one or more orifices (holes) 14 extending from an exterior surface of a jumper tube connector 6 inward there through. In one aspect, a hole 14 may extend through an exterior surface 16 of a narrow side 40 of a jumper tube connector 6. In one aspect, one or more of the holes 14 may comprise internal threading, such as internal threading 18, as shown in the embodiment of the present invention depicted in FIG. 4. In one aspect, a hole 14 may be utilized to secure a jumper tube connector 6 to the jumper tube 4, and/or to a shunt tube 20 (see FIG. 2), when circumferentially engaged therewith (see FIG. 3), such as by extension of a screw (not shown), engaged with threading 18, through the hole 14 into engagement with an exterior surface 22 of jumper tube 4 or an exterior surface 24 of a shunt tube 20.

FIG. 2 depicts a prior art jumper connector assembly 2 positioned proximate a pipe assembly 26. In the aspect of jumper connector assembly 2 shown in FIG. 2, as compared to FIG. 1, jumper tube connectors 6 have been slidingly extended to or beyond ends 8a and 8b of jumper tube 4. In one aspect shown in FIG. 2, pipe assembly 26 comprises two longitudinally aligned pipe segments 28a, 28b, fluidly connected by a pipe connector 30. Pipe assembly 26 further comprises two pairs of longitudinally aligned shunt tubes 20a, 20b that are affixed to the exterior surface 32 of pipe segment 28a, 28b. In other aspects, more or fewer pairs of longitudinally aligned shunt tubes 20 may be employed. In the aspect shown in FIG. 2, the shunt tubes 20 are affixed to the pipe segments 28 via a shunt tube bracket 35, although other means of attachment are sometimes employed. As shown in FIG. 2, each shunt tube 20a, 20b, comprises and an end 34a, 34b, respectively.

FIG. 3 shows a prior art jumper connection assembly 2 fluidly connected at both ends thereof to a pair of aligned shunt tubes 20a, 20b. To accomplish the shunt tube connection depicted in FIG. 3, jumper assembly 2 has been axially aligned intermediate shunt tubes 20a, 20b, whereupon jumper tube connectors 6 have been slidingly extended away from each other along jumper tube 4 into circumferential engagement around shunt tube 20a end 34a and shunt tube 20b end 34b.

In an embodiment of the present invention, as depicted in FIGS. 4 and 5A-5E, a jumper tube connector 6A comprises a substantially rectangularly shaped interior cavity 44 sized and adapted to be circumferentially engaged around an end 34 of a substantially exteriorly rectangular shunt tube 20. Although the external geometry of the shunt tubes 20 depicted herein comprises rounded corners, and the internal geometry of the jumper tube connectors 6 depicted herein comprises rounded corners, for simplicity only such geometries are referred to herein as rectangular or substantially rectangular, and such nomenclature is not intended to be limiting as to the tubular geometries with which embodiments of the present invention may be employed. In one embodiment, jumper tube connector 6A interior cavity 44 comprises two seal grooves 48, one groove proximate distal end 10 and one groove proximate proximal end 12, each sized and adapted to accommodate a sealing component (not shown), such as an o-ring, that is employed to provide a fluid seal between the jumper tube connector 6A and a jumper tube 4 around which it is circumferentially engaged, and between the jumper tube connector 6A and a shunt tube 20 around which it is circumferentially engaged. In one embodiment, an o-ring employable with a jumper connector tube 6A of the present invention may comprise nitrile rubber (NBR), such as but not limited to, NBR 90, although other o-ring materials may be employed, as would be understood by one skilled in the art.

In one embodiment, a jumper tube connector 6A comprises a wide dimension (sides) 38 and the narrow dimension (sides) 40. In one embodiment, a jumper tube connector 6A comprises a non-uniform wall thickness 36 along its two opposing wide sides 38, and a uniform wall thickness 42 along its two opposing narrow sides 40. In one embodiment, the wide side 38 wall thickness 36 comprises at least portions thereof being thicker than the substantially uniform wall thickness 42 of the connector's two opposing narrow sides 40. In one embodiment, the non-uniformity of opposing wide sides 38 thickness 36 provides a convex jumper tube connector wide side 38 exterior surface 46 geometry. In the embodiment depicted in FIGS. 4, and 5A-5E, a jumper tube connector 6A comprises a plurality of holes 14 comprising internal threading 18, however, the invention is not so limited and embodiments comprising more, fewer, or no holes 14, or one or more holes 14 not comprising internal threading 18, may be employed.

Figure 5A:
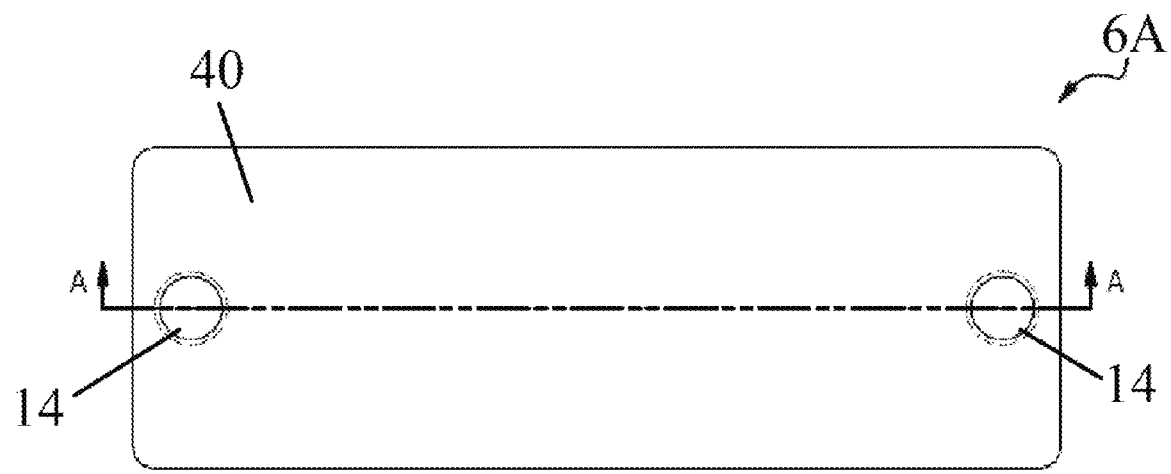
FIG. 5A depicts a top view of an embodiment of a jumper tube connector of the present invention.
Figure 5B:
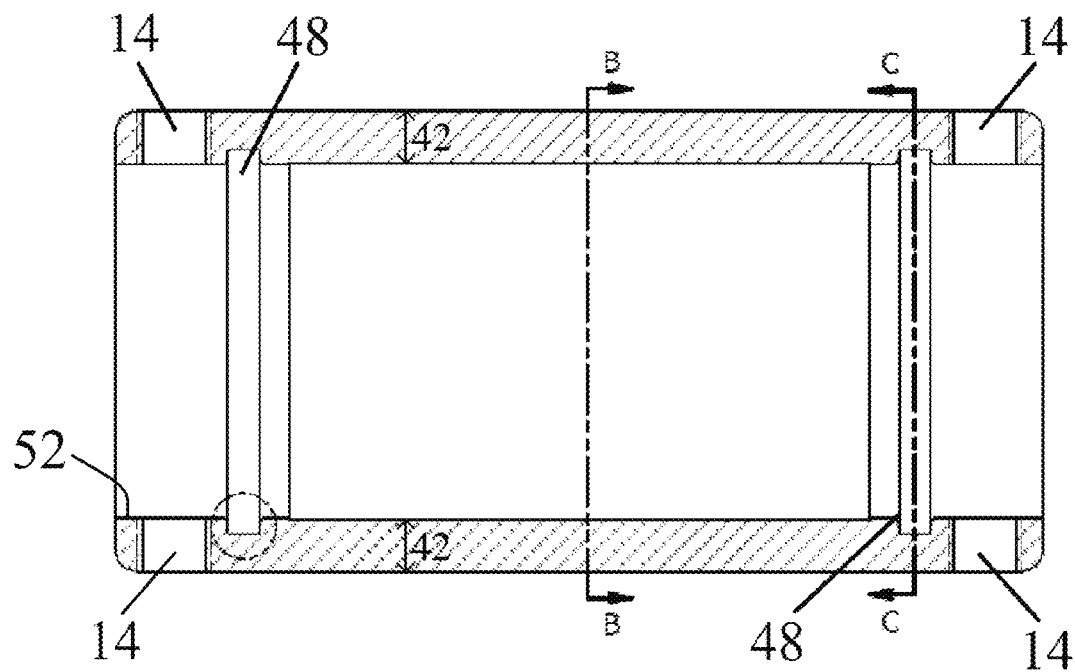
FIG. 5B depicts a sectional view of the embodiment of a jumper tube connector of the present invention depicted in FIG. 5A.
Figure 5C:
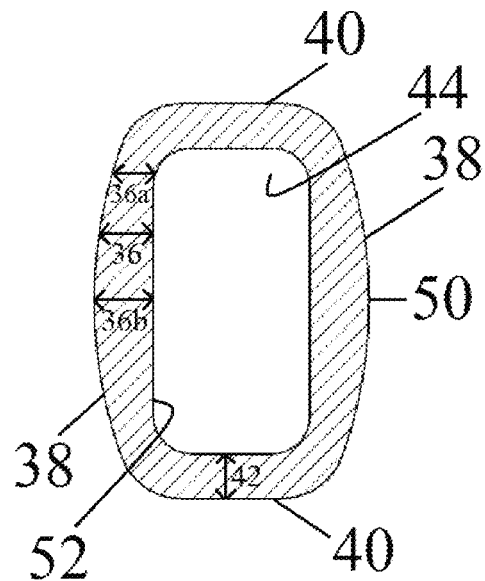
FIG. 5C depicts a sectional view of the embodiment of a jumper tube connector of the present invention depicted in FIG. 5B.
Figure 5D:
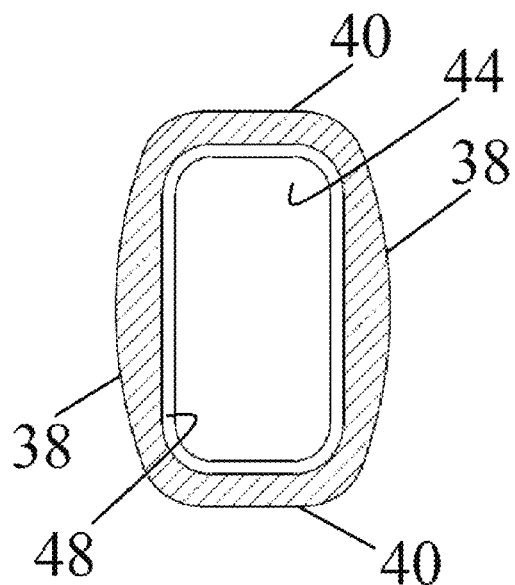
FIG. 5D depicts another sectional view of the embodiment of a jumper tube connector of the present invention depicted in FIG. 5B.
Figure 5E:
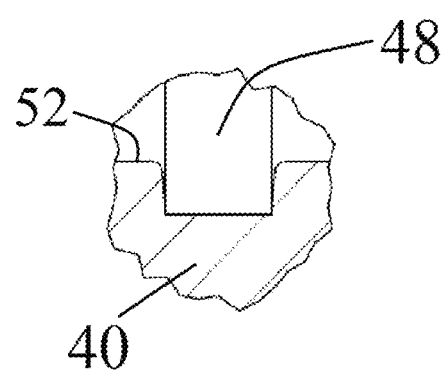
FIG. 5E depicts an expanded view of a portion of the embodiment of a jumper tube connector of the present invention depicted in FIG. 5B.

FIG. 5A depicts a top view of the embodiment of jumper tube connector 6A, showing a narrow side 40 and two holes 14. A sectional rendering of FIG. 5A along axial axis A-A of jumper connector 6A yields the depiction of FIG. 5B. In FIG. 5B can be seen the wall thickness 42 of narrow side 40 of jumper tube connector 6A and two seal grooves 48. A sectional rendering of FIG. 5B along transverse axis B-B of jumper connector 6A yields the depiction of FIG. 5C. In FIG. 5C can be seen the wall thickness 42 of narrow side 40 of jumper tube connector 6A, and the wall thickness 36 of wide side 38 of jumper tube connector 6A. In the embodiment of FIG. 5C, the wall thickness 36 of wide side 38 of jumper tube connector 6A increases from a minimum wall thickness 36a, proximate narrow side 40, to a maximum wall thickness 36b, proximate a midpoint 50 along wide side 38; although the invention is not so limited and other wide side 38 geometries may be employed. A sectional rendering of FIG. 5B along transverse axis C-C of jumper connector 6A yields the depiction of FIG. 5D. In the embodiment of FIG. 5D can be seen seal groove 48 within jumper tube connector 6A interior cavity 44, wherein the seal groove 48 extends transversely along the entirety of inner surface 52 of interior cavity 44. As described above, seal groove 48 provides a seat for a sealing component (not shown) such as an o-ring, which is positioned within interior cavity 44. FIG. 5E, which depicts a zoomed view of the encircled portion of FIG. 5B, shows in greater detail the penetration of seal groove 48 into inner surface 52 of interior cavity 44 of jumper connector 6A.

As is known in the art, jumper tube connectors 6A may be comprised of metals and/or metal alloys. In one embodiment, a jumper tube connector 6A comprises type 316 stainless steel. In one embodiment, a jumper tube connector 6A comprises cast iron. In one embodiment, such cast iron comprises about 1.8-4.0 weight percent carbon and about 1-3 weight percent silicon.

In one embodiment, a jumper connector 6A of the present invention may comprise a coating (not shown) on at least a portion of an exterior and/or interior surface thereof. In one embodiment, such a coated jumper connector 6A may comprise one or more coating layers on exterior surfaces 16 and/or 46 thereof. In one embodiment, such a coated jumper connector 6A may comprise one or more coating layers on inner surface 52 of interior cavity 44 thereof. In one embodiment, such a coated jumper connector 6 may comprise one or more coating layers on internal threading 18 of one or more holes 14 thereof.

In one embodiment, jumper connector 6A exterior surfaces 16 and/or 46 may comprise or be coated with an erosion resistant and/or low-friction material. Some examples of coating materials are disclosed in U.S. Pat. No. 8,261,841 to Bailey et al., which patent is incorporated herein by reference as if reproduced in full herein. In one embodiment, the coating material comprises a diamond-like-carbon (DLC) material. In one embodiment, the coating material comprises a carbide material. In one embodiment, a coating layers may be provided by nickel powder coating or plasma transfer arc hardfacing. In one embodiment, a coating layer has a thickness of about 0.5-50 μm. In one embodiment, multiple layers of coating material may comprise the same or different coating materials. In addition, coating layers disposed on exterior surface 16, exterior surface 46, inner surface 52, and/or internal threading 18 may comprise the same or different coating materials.

Operation

In one embodiment of the present invention, connection of two axially aligned shunt tubes 20 affixed, directly or indirectly, to adjacent axially aligned pipe segments that have been connected or are to be connected, comprises providing two jumper tube connectors 6A, wherein an o-ring (not shown) is disposed in each of two interior cavity 44 seal grooves 48 of each jumper tube connector 6A. The jumper connectors 6A are engaged around a jumper tube 4, as shown in the prior art example of FIG. 1, by circumferentially slidingly advancing a proximal end 12 of one jumper connector 6A onto end 8a of jumper tube 4 and circumferentially slidingly advancing a proximal end 12 of the other jumper connector 6A onto end 8b of jumper tube 4, to provide a jumper connector assembly 2. The so provided jumper connector assembly 2 is then axially aligned between the shunt tubes 20 to be connected, whereupon the jumper connectors 6A are slidingly advanced, away from each other, along the jumper tube 4, whereby a distal end 10 of each jumper connector 6 is circumferentially engaged around an end 34 of a shunt tube 20, as shown in the prior art example of FIG. 3.

Test Results

Embodiments of a jumper tube connector 6A of the present invention, as well as prior art jump tube connectors 6, were subjected to pressure testing. In a controlled environment, "shunt tube assemblies," each comprising a pair of shunt tubes 20 connected by a jumper connector assembly (containing a jumper tube connector 6A or a prior art jumper tube connector 6), were subjected to elevated internal pressurization. Jumper tube assemblies requiring two different sizes of jumper tube connectors (1.5"×0.75" (large) and 1.0'×0.5" (small)) were tested. The results are shown in Table 1 below.

| Jumper Tube Connector Type | Jumper Tube Connector Size | Height Initial Measurement | Width Initial Measurement | Height Final Measurement | Width Final Measurement | O-Ring Failure Pressure |
|---|---|---|---|---|---|---|
| Prior Art | Large | 1.980" | 1.122" | 1.980" | 1.275" | 5,500 psi |
| Prior Art | Large | 1.979" | 1.129" | 1.979" | 1.256" | 4,700 psi |
| Present Invention | Large | 1.985" | 1.395" | 1.985" | 1.476" | 10,000 psi |
| Present Invention | Large | 1.990" | 1.386" | 1.990" | 1.468" | >10,000 psi |
| Prior Art | Small | 1.352" | 0.860" | 1.353" | 0.880" | 6,100 psi |
| Prior Art | Small | 1.348" | 0.860" | 1.350" | 0.878" | 6,500 psi |
| Present Invention | Small | 1.350" | 1.090" | 1.350" | 1.100" | >10,000 psi |
| Present Invention | Small | 1.350" | 1.090" | 1.350" | 1.095" | 9,000 psi |

Figure 6A:
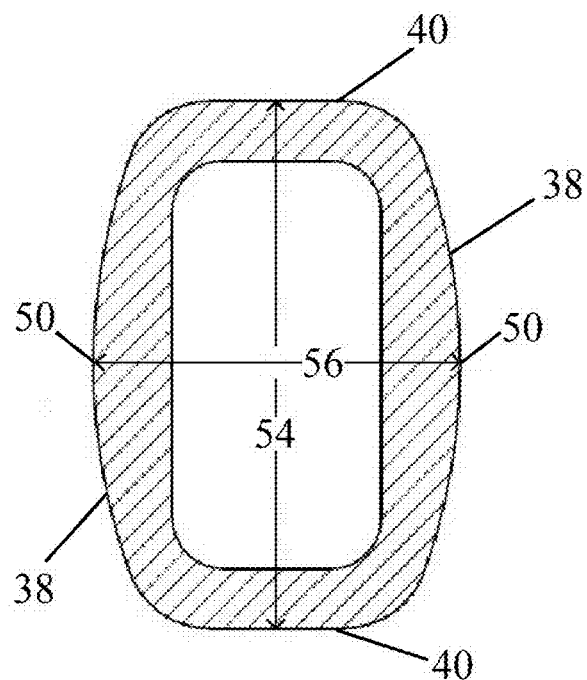
FIG. 6A depicts an end-on view of an embodiment of a jumper tube connector of the present invention.
Figure 6B:
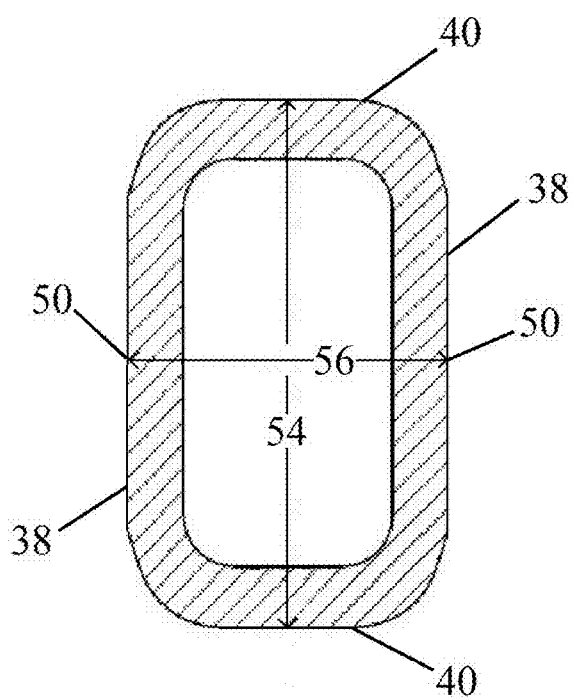
FIG. 6B depicts an end-on view of a standard prior art jumper tube connector.

In Table 1, initial measurements refer to outer diameters before pressure testing and final measurements refer to outer diameters after pressure testing. Specifically, height measurements refer to jumper connector tube height 54, and width measurements refer to jumper connector tube width 56, as depicted in the sectional views of FIGS. 6A and 6B, for jumper tube connectors 6A and prior art jumper tube connectors 6, respectively. Width 56 measurements listed in Table 1 refer to the outer diameter at the midpoint 50 of wide sides 38. As can be seen from the data in Table 1, jumper tube connectors 6A of the present invention withstood a substantially higher pressure before failure than their prior art (industry standard) counterparts. Not to be bound by theory, it is believed that this increase in pressure stability is at least partially attributable to a diminishment in wide side 38 expansion (bowing). As would be understood by one skilled in the art, such bowing is coincident with deformation of seal grooves 48. Deformation of seal grooves 48 can affect the seating therein of o-rings (not shown) positioned therein, thereby creating sealing defects between the jumper tube connector (6 or 6A) and the shunt tube 20 and between the jumper connector (6 or 6A) and the jumper tube 4. As can gleaned from the data in Table 1, large prior art jumper connectors 6 displayed an average wide side 38 expansion of 12.5%, while embodiments of large jumper connectors 6A of the present invention experienced only an average wide side 38 expansion of 5.9%. Similarly, small prior art jumper connectors 6 displayed an average wide side 38 expansion of 2.2%, while embodiments of small jumper connectors 6A of the present invention experienced only an average wide side 38 expansion of 0.7%.

Method

In one embodiment, a shunt tube connection method 100 of the present invention comprises the following steps:

A Jumper Tube Connector Preparation Step 102 comprising providing two jumper tube connectors, such as jumper tube connectors 6A, each jumper tube connector comprising a plurality of interior transverse grooves, such as seal grooves 48, wherein a sealing component, such as an o-ring, is positioned at least partially within each of at least two of the seal grooves of each jumper tube connector.

A Jumper Tube Connector Assembly Preparation Step 104 comprising providing a jumper tube, such as jumper tube 4, and the two o-ring equipped jumper tube connectors, wherein the two jumper tube connectors are fluidly circumferentially engaged around at least a portion of opposite ends of the jumper tube.

A Jumper Tube Connector Assembly Provision Step 106 comprising providing the thus prepared jumper tube connector assembly between an axially aligned pairs of shunt tubes, such as shunt tubes 20, to be fluidly connected, such that each jumper tube connector is disposed proximate and axially aligned with a shunt tube.

A Jumper Tube Connector Assembly Installation Step 108 comprising slidably extending each jumper tube connector into fluid engagement around a shunt tube.

Method 100 is merely exemplary, and additional embodiments of a method of utilizing a jumper tube connector 6A of the present invention consistent with the teachings herein may be employed. In addition, in other embodiments, one or more of these steps may be combined, repeated, re-ordered, or deleted, and/or additional steps may be added. For example, in one embodiment, one or both of the jumper tube connectors 6A may be provided separately from the jumper tube 4 and slidingly engaged around a shunt tube 20, whereupon the jumper tube 4 is provided and each jumper tube connector 6A already fluidly engaged with a shunt tube 20 is slidingly fluidly engaged around the jumper tube 4. In another example, attachment means, including but not limited to, screws, snap clips, and/or retention clips (not shown), may be employed to affix one or both jumper tube connectors 6A to the jumper tube 4 and/or a shunt tube 20, and/or otherwise restrict sliding movement of the jumper tube connector 6A with respect to the jumper tube 4 and/or a shunt tube 20, as would be understood by one skilled in the art.

While the preferred embodiments of the invention have been described and illustrated, modifications thereof can be made by one skilled in the art without departing from the teachings of the invention. Descriptions of embodiments are exemplary and not limiting. Disclosure of existing patents, publications, and known art are incorporated herein by reference to the extent required to provide details and understanding of the disclosure herein set forth.

I claim:

1. A jumper tube connector comprising:
   a tube; wherein:
      said tube comprises a substantially rectangularly shaped interior cavity;
      said interior cavity comprises a plurality of transversely oriented grooves, each extending along the entirety of the surface of the interior cavity;
      said tube comprises two opposing narrow walls along a first dimension thereof;
      said tube comprises two opposing wide walls along a second dimension thereof;
      said narrow walls comprise a substantially uniform thickness along said first dimension;
      said wide walls comprise a non-uniform thickness along said second dimension, whereby said wide walls exhibit an at least partially convex exterior geometry.

2. The jumper tube connector of claim 1, wherein at least one narrow wall comprises one or more orifices extending transversely there though.

3. The jumper tube connector of claim 2, wherein at least one said orifice comprises internal threading.

4. The jumper tube connector of claim 1, wherein at least one said groove has a sealing component positioned at least partially there within.

5. The jumper tube connector of claim 1, wherein at least one coating layer is disposed on at least one surface selected from the group consisting of:
   an exterior surface of said tube; and
   an interior surface of said tube.

6. The jumper tube connector of claim 5, wherein at least one said coating layer comprises a diamond-like-carbon material.

7. The jumper tube connector of claim 1, wherein the wall thickness of at least one said wide wall increases from a minimum wall thickness proximate junctures thereof with said narrow side walls, to a maximum wall thickness proximate a midpoint there along.

8. A jumper tube connection assembly comprising;
   two jumper tube connectors according to claim 1; and
   a jumper tube; wherein
      each of a first said jumper tube connector and a second said jumper tube connector contains a sealing component disposed at least partially within one said groove disposed proximate a first end thereof;
      said first end of said first jumper tube connector is circumferentially engaged about a portion of a first end of said jumper tube, wherein a portion of said sealing component contacts at least a portion of an outer surface of said jumper tube; and
      said first end of said second jumper tube connector is circumferentially engaged about a portion of a second end of said jumper tube, wherein a portion of said sealing component contacts at least a portion of an inner surface of said jumper tube.

9. The jumper tube connection assembly of claim 8, wherein at least one narrow wall comprises one or more orifices extending transversely there though.

10. The jumper tube connection assembly of claim 9, wherein at least one said orifice comprises internal threading.

11. The jumper tube connection assembly of claim 8, wherein at least one coating layer is disposed on at least one surface selected from the group consisting of:
- an exterior surface of said tube; and
- an interior surface of said tube.

12. The jumper tube connection assembly of claim 11, wherein at least one said coating layer comprises a diamond-like-carbon material.

13. The jumper tube connection assembly of claim 8, wherein the wall thickness of at least one said wide wall of at least one said jumper tube connector increases from a minimum wall thickness proximate junctures thereof with said narrow side walls thereof, to a maximum wall thickness proximate a midpoint there along.

14. A method of connecting shunt tubes comprising:
- providing two jumper tube connectors according to claim 1 and a jumper tube, wherein each of a first said jumper tube connector and a second said jumper tube connector contains a sealing component disposed at least partially within a first said groove disposed proximate a first end thereof, and a sealing component disposed at least partially within a second said groove disposed proximate a second end thereof;
- slidingly circumferentially engaging said first end of said first jumper tube connector around a first end of said jumper tube and slidingly circumferentially engaging said first end of said second jumper tube connector around said second end of said jumper tube, wherein a portion of each said sealing component disposed within said first end of each said jumper tube connector contacts at least a portion of an outer surface of said jumper tube, thereby providing a jumper tube connection assembly;
- providing said jumper tube connection assembly axially between a first shunt tube and a second shunt tube to be connected, wherein said shunt tubes are axially aligned; and
- slidingly extending said jumper tube connectors along said jumper tube, away from each other, whereby said first jumper tube connector second end is slidingly provided in circumferential engagement around a proximate end of said first shunt tube and said second jumper tube connector second end is slidingly provided in circumferential engagement around a proximate end of said second shunt tube, wherein a portion of said sealing component disposed within said first jumper tube connector second end contacts at least a portion of an outer surface of said shunt tube and a portion of said sealing component disposed within said second jumper tube connector second end contacts at least a portion of an outer surface of said second shunt tube.

15. The method of claim 14, wherein at least one narrow wall comprises one or more orifices extending transversely there though.

16. The method of claim 14, wherein at least one said orifice comprises internal threading.

17. The method of claim 14, wherein at least one coating layer is disposed on at least one surface selected from the group consisting of:
- an exterior surface of said tube; and
- an interior surface of said tube.

18. The method of claim 14, wherein the wall thickness of at least one said wide wall increases from a minimum wall thickness proximate junctures thereof with said narrow side walls, to a maximum wall thickness proximate a midpoint there along.

19. The method of claim 14, wherein the order of component engagement is altered such that instead of engaging said jumper tube connectors with said jumper tube to form said jumper tube connection assembly:
- said second end of said first jumper tube connector is slidingly circumferentially engaged around said proximate end of said first shunt tube, wherein a portion of said sealing component disposed within said first jumper tube connector second end contacts at least a portion of an outer surface of said first shunt tube;
- said second end of said second jumper tube connector is slidingly circumferentially engaged around said proximate end of said second shunt tube, wherein a portion of said sealing component disposed within said second jumper tube connector second end contacts at least a portion of an outer surface of said second shunt tube;
- said jumper tube is axially aligned between said first end of said first jumper tube connector and said first end of said second jumper tube connector, such that said first end of said jumper tube is positioned proximate said first shunt tube and said second end of said jumper tube is positioned proximate said second shunt tube;
- said first jumper tube connector is slidingly extended along said first shunt tube, toward said jumper tube, whereby said first jumper tube connector first end is slidingly provided in circumferential engagement around said first end of said jumper tube, wherein a portion of said sealing component disposed within said first jumper tube connector first end contacts at least a portion of an outer surface of said jumper tube; and
- said second jumper tube connector is slidingly extended along said second shunt tube, toward said jumper tube, whereby said second jumper tube connector first end is slidingly provided in circumferential engagement around said second end of said jumper tube, wherein a portion of said sealing component disposed within said second jumper tube connector first end contacts at least a portion of an outer surface of said jumper tube.

20. The method of claim 19, wherein the order of component engagement is altered such that instead of slidingly circumferentially engaging said second end of said second jumper tube connector around said proximate end of said second shunt tube:
- said first end of said second jumper tube connector is slidingly circumferentially engaged around said second end of said jumper tube, wherein a portion of said sealing component disposed within said second jumper tube connector first end contacts at least a portion of an outer surface of said jumper tube; and
- said second jumper tube connector is slidingly extended along said jumper tube, toward said second shunt tube, whereby said second jumper tube connector second end is slidingly provided in circumferential engagement around said proximate end of said second shunt tube, wherein a portion of said sealing component disposed within said second jumper tube connector second end contacts at least a portion of an outer surface of said second shunt tube.

* * * * *